UNITED STATES PATENT OFFICE.

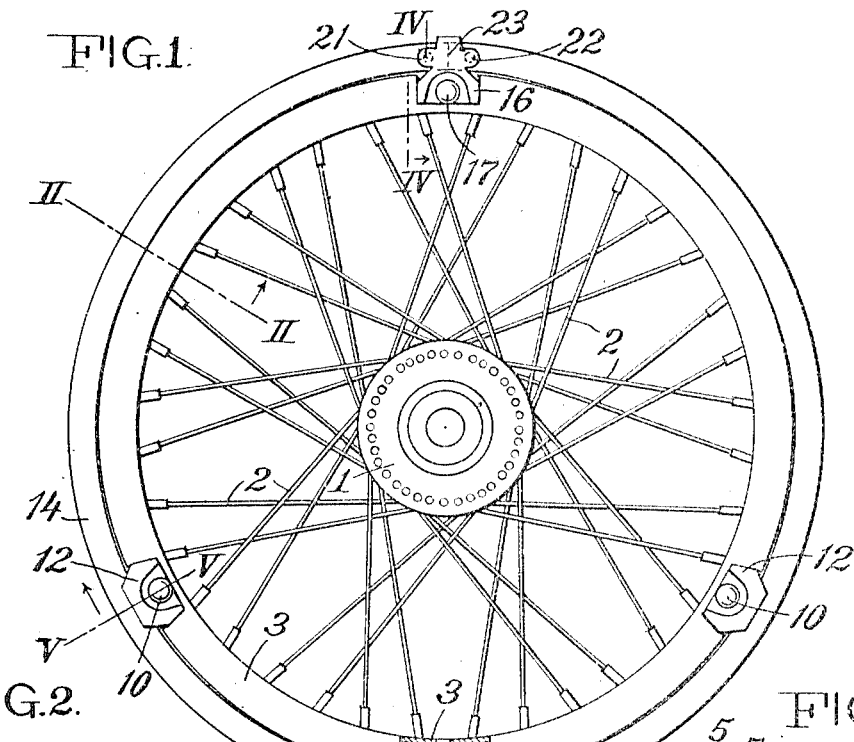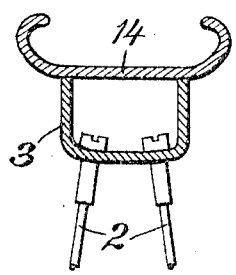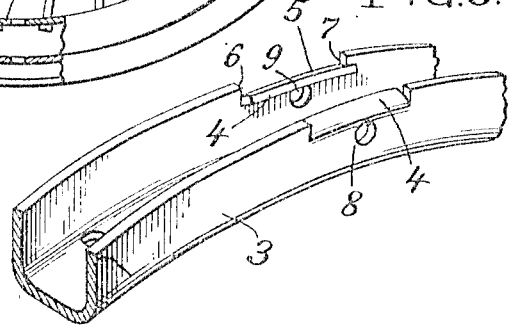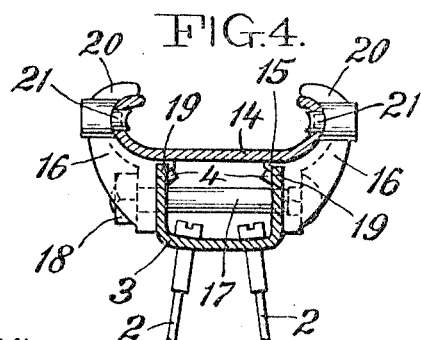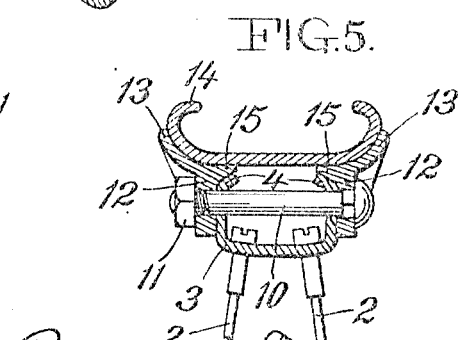

RICHARD W. FUNK, OF WEEHAWKEN, NEW JERSEY, ASSIGNOR TO R. W. FUNK, INCORPORATED, OF NEW YORK, N. Y., A CORPORATION OF NEW YORK.

VEHICLE WHEEL-RIM.

1,064,066.   Specification of Letters Patent.   Patented June 10, 1913.

Application filed January 18, 1913. Serial No. 742,767.

*To all whom it may concern:*

Be it known that I, RICHARD W. FUNK, a citizen of the United States, residing in the city of Weehawken, county of Hudson, and State of New Jersey, have invented certain new and useful Improvements in Vehicle Wheel-Rims, of which the following is a specification.

My invention relates to that type of vehicle wheel rim in which the metallic tire-carrying member is separable from the periphery of the wheel, forming what is commonly known as a "demountable rim" structure. This device permits the motorist to carry fully inflated spare tires upon spare rims ready to replace the rim and tire already in place upon the wheel in case of accident to the latter.

My present invention is directed to certain improvements and developments of the invention described in my application for United States Letters Patent, Serial Number 704,406, filed June 18, 1912, and is particularly applicable to what are termed "wire wheels", that is, wheels having spokes formed of wires instead of the wooden spokes with which artillery wheels are provided. My device is adapted to be constructed of steel cold-rolled into shape, and is light, inexpensive, simple and durable.

In the accompanying drawings which form a part of this specification, Figure 1 is a side elevation of a complete wire wheel forming an embodiment of my invention; Fig. 2 is a transverse sectional view on line II—II of Fig. 1; Fig. 3 is a fragmentary perspective view of the rolled metal fixed rim or channel member; Fig. 4 is a transverse sectional view on line IV—IV of Fig. 1, and Fig. 5 is a transverse sectional view on line V—V of Fig. 1.

Referring to the drawings in detail, the numeral 1 designates the hub from which extend the wire spokes 2 secured at their outer extremities in any usual and well-known fashion to a base member 3 having a channel section with parallel legs, and constituting a fixed wheel member or fixed rim. This base member may preferably be formed by cold-rolling a sheet steel strip of the required width into a hoop, electrically welding the abutting ends, and then producing a channel section by further rolling. By passing the structure thus obtained through truing rolls, sufficient accuracy may be obtained to obviate the necessity for any machining of the device as a whole. At spaced intervals about the periphery of this base or channel member, homologously arranged lips or flanges 4 are formed by cutting the metal of the legs of the channel at 6 and 7 and bending the section of metal included between these cuts inwardly and at an angle with respect to the plane of the wheel. Axially alined holes 8 and 9 are drilled through the legs of the channel for the reception of the bolts which, in conjunction with the nuts 11, hold in place the two pairs of wedge members 12, each pair of which includes oppositely disposed wedge surfaces 13 for the retention of the transversely split tire-carrying rim 14 and a second wedge surface 15 adapted to ride upon the inturned inclined flanges 4. A special pair of wedges 16 is similarly secured to the base member by means of a bolt 17 and nut 18. These wedges have wedge surfaces 19 similar to the surfaces 15 of the other sets of wedges, and in addition are provided with clip members 20 for embracing a portion of the tire-carrying rim, and pins 21 and 22 for engagement with holes formed in either side of the transverse split 23 in the tire-carrying rim. This particular construction is illustrated and described in my co-pending application aforesaid and need not be further described here.

In attaching a rim to a wheel, the tightening of the nuts upon the bolts after the parts are assembled as shown in the drawings will cause the wedges to ride radially outward with respect to the wheel upon the inclined flange members 4, thus clamping the rim rigidly upon the wheel. This action will force the rim to hug the base member or fixed rim at points intermediate of the wedges, as illustrated in Figs. 1 and 2, and the rim will therefore be supported for a substantial distance about its periphery and will not depend solely upon the radial support offered by the wedges. At the same time the metal-to-metal contact will be comparatively so small that "freezing" of the rim to the base member, due to rusting or other causes, need not be feared, since such corrosion will be slight in any case and may be wholly obviated by constructing the rim of any of the well-known anti-corrosion metals now commonly used for preventing such action.

It is obvious that by decreasing the radius of the fixed rim with respect to that of the tire-carrying rim, the latter will be supported entirely by the wedges, as in the so-called "Continental" type of demountable rim. I regard the construction first described as preferable, however.

Having thus described my invention, I claim:

1. In a vehicle wheel, a fixed rim comprising a channel section and a plurality of flanges for supporting a rim-engaging member, said flanges extending from and being angularly disposed to the legs of said channel and being oppositely inclined to the plane of the wheel.

2. In a vehicle wheel, a fixed rim comprising a channel section and a plurality of opposed flanges for supporting a rim-engaging member, said flanges being disposed in pairs angularly spaced about the periphery of the legs of said channel, each of said flanges extending inwardly from and being angularly disposed to a leg of said channel.

3. In a vehicle wheel, a fixed rim comprising a channel section, and means for supporting a rim-engaging member including a flange extending from one leg of said channel and inclined in the direction of the other leg, and a second flange extending from the other leg of the channel and inclined toward the first-named leg.

4. In a vehicle wheel, a fixed rim comprising a channel section and a plurality of flanges integral with the legs of and angularly spaced about, said channel, each of said flanges consisting of a section partially severed from said member and bent away from the same.

5. In a vehicle wheel, a fixed rim comprising a channel section and a plurality of flanges integral with and angularly spaced about said channel, each of said flanges consisting of a section partially severed from one leg of the channel and bent away from the same.

6. In a vehicle wheel, a fixed rim comprising a channel section and a plurality of opposed flanges integral with and angularly spaced about said channel, each of said flanges consisting of a section partially severed from one leg of the channel and bent away from the same toward the opposite leg.

7. In a vehicle wheel, a fixed rim comprising a channel section and pairs of homologously arranged flanges angularly spaced about said member, each of said flanges consisting of a section partially severed from the body of the member and bent away from the same to form a support for a rim-engaging member.

8. In a vehicle wheel, a fixed rim comprising a channel section and means integral therewith for supporting a rim-engaging member, said means including a section partially severed from one leg of said channel and bent toward the other leg of the channel, and a second section partially severed from the other leg of the channel and bent toward the first-named leg.

9. In a vehicle wheel, a fixed rim comprising a channel section having its base nearest the axis of the wheel, a tire-carrying rim, and means for supporting it upon the fixed rim including a flange partially severed from a leg of the channel and bent away therefrom, a wedge member adapted to ride upon said flange and engage said rim, and means for securing said wedge member in place.

10. In a vehicle wheel, a fixed rim comprising a channel section having its base nearest the axis of the wheel, a tire-carrying rim, and means for mounting it upon the fixed rim including a flange partially severed from one leg of said channel and bent toward the opposite leg of the same, a second flange partially severed from the other leg of the channel and bent toward the first-named leg, a pair of homologously arranged wedge members adapted to ride upon said flanges and engage said tire-carrying rim, and means for securing said wedges to said fixed rim.

11. In a vehicle wheel, a fixed rim comprising a channel section having its base nearest the axis of the wheel, a tire-carrying rim, and means for mounting it upon the fixed rim including a flange partially severed from one leg of said channel and bent toward the opposite leg of the same, a second flange partially severed from the other leg of the channel and bent toward the first-named leg, a pair of homologously arranged wedge members adapted to ride upon said flanges and engage said tire-carrying rim, and a bolt passing through the legs of said fixed rim adjacent to said flanges and adapted to carry said wedges.

RICHARD W. FUNK.

Witnesses:
DOMINICK A. CANEPA,
OLIVER WILLIAMS.